United States Patent

Sano et al.

[11] 4,189,963
[45] Feb. 26, 1980

[54] INDEX APPARATUS FOR ROTARY TABLE

[75] Inventors: Yoshikazu Sano, Kariya; Kyosuke Haga, Anjo; Kengo Yoshioka, Kariya, all of Japan

[73] Assignee: Toyoda-Koki Kabushiki-Kaisha, Kariya, Japan

[21] Appl. No.: 928,250

[22] Filed: Jul. 26, 1978

[30] Foreign Application Priority Data

Aug. 8, 1977 [JP] Japan ................... 52-94868

[51] Int. Cl.² ............. B23B 29/24; B23Q 17/00
[52] U.S. Cl. .................... 74/821; 74/813 C; 74/816; 74/817; 74/826
[58] Field of Search ............. 74/817, 813 R, 813 C, 74/816, 818, 821, 826

[56] References Cited

U.S. PATENT DOCUMENTS

| | | | |
|---|---|---|---|
| 2,366,398 | 1/1945 | Harrington | 74/821 |
| 2,947,974 | 8/1960 | Stickel | 74/816 X |
| 3,054,333 | 9/1962 | Brainard et al. | 90/56 |
| 3,072,836 | 1/1963 | Eisengrein | 74/821 X |
| 3,196,715 | 7/1965 | Rainey et al. | 74/821 |
| 3,513,730 | 5/1970 | Lohneis | 77/64 |
| 3,587,390 | 6/1971 | Lohneis et al. | 90/58 R |
| 3,593,597 | 7/1971 | Jennings | 74/818 |
| 3,795,155 | 3/1974 | Price et al. | 74/813 C X |
| 3,888,140 | 6/1975 | Mackelvie | 74/821 X |
| 3,903,758 | 9/1975 | Keickel | 74/817 X |
| 3,965,775 | 6/1976 | Pinkesfeld | 74/816 X |

FOREIGN PATENT DOCUMENTS

| | | | |
|---|---|---|---|
| 2129515 | 12/1972 | Fed. Rep. of Germany | 74/813 R |
| 810295 | 3/1959 | United Kingdom | 74/821 |
| 987658 | 3/1965 | United Kingdom | 74/826 |

*Primary Examiner*—Leslie Braun
*Attorney, Agent, or Firm*—Oblon, Fisher, Spivak, McClelland & Maier

[57] ABSTRACT

An index apparatus for indexing a rotary table rotatably and vertically slidably received within a base, comprises a pair of coupling members secured to the rotary table and the base, respectively, and engageable with each other. The rotary table is lifted and lowered by a hydraulic actuator. The rotary table is rotated by a drive means including a drive motor. Generating means are provided to generate a signal each time the rotary table is rotated a unit angle. Control means are provided to reduce the rotational speed of the rotary table in response to the number of signals generated from the generating means, when the rotary table is rotated to a position spaced a predetermined angular distance from a desired angular position thereof. Control means also cause the rotation of the rotary table to stop in response to the number of signals from the generating means, when the rotary table is rotated to the desired angular position thereof.

6 Claims, 3 Drawing Figures

INDEX APPARATUS FOR ROTARY TABLE

BACKGROUND OF THE INVENTION

1. Field of the Invention

The present invention relates to an index apparatus for indexing a rotary table to a desired angular position.

2. Description of the Prior Art

When a gear coupling such as Curvic Coupling is used to index a rotary table of a machine tool, the number of teeth of the gear coupling is determined depending upon a minimum index angle of the rotary table. When the minimum index angle of the rotary table is more than 5 degrees, the number of teeth of the gear coupling is relatively small and the whole depth of the tooth is relatively large. Accordingly, even if a slight misalignment is produced between the complementarily engageable teeth, these teeth are forcibly engaged with each other. However, when the minimum index angle of the rotary table is small, for example, one degree, the number of teeth of the gear coupling becomes relatively large and the whole depth of the tooth becomes considerably smaller. Accordingly, if the rotary table is not accurately indexed, the engagement between the complementarily engageable teeth is not smoothly performed.

SUMMARY OF THE INVENTION

It is an object of the present invention to provide a new and improved index apparatus capable of indexing a rotary table to a desired angular position with high accuracy.

Another object of the present invention is to provide a new and improved index apparatus wherein a signal is generated each time the rotary table is rotated a unit angle and the rotary table is reduced in rotational speed and stopped at a desired angular position in response to the number of the signal.

Briefly, according to the present invention, these and other objects are achieved by providing an index apparatus for a rotary table, as mentioned below. The rotary table is rotatably and vertically slidably received within a base. A first annular coupling member is secured to the rotary table and a second annular coupling member engageable with the first annular coupling member is secured to the base. A hydraulic actuator is formed in the base and connected to the rotary table for lifting the rotary table to disengage the first coupling member from the second coupling member to permit rotation of the rotary table relative to the base and for lowering the rotary table to engage the first coupling member with the second coupling member. A drive means includes a drive motor and is connected to the rotary table to rotate the same when the first coupling member is disengaged from the second coupling member. Generating means is connected to the drive means for generating a signal each time the rotary table is rotated a unit angle. A first control means is connected to the drive motor for controlling the operation thereof. Instructing means is provided for instructing a desired angular position of the rotary table. A second control means is responsive to the instructing means, and a signal from the generating means, for causing the first control means to reduce the rotational speed of the rotary table, when the rotary table is rotated to a position spaced a predetermined angular distance from the desired angular position thereof. A restricting means is operated responsive to the second control means for restricting the rotation of the rotary table when the rotary table is rotated to the desired angular position. The hydraulic actuator is operable to lower the rotary table to engage the first coupling member with the second coupling member, when the restricting means is operated.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
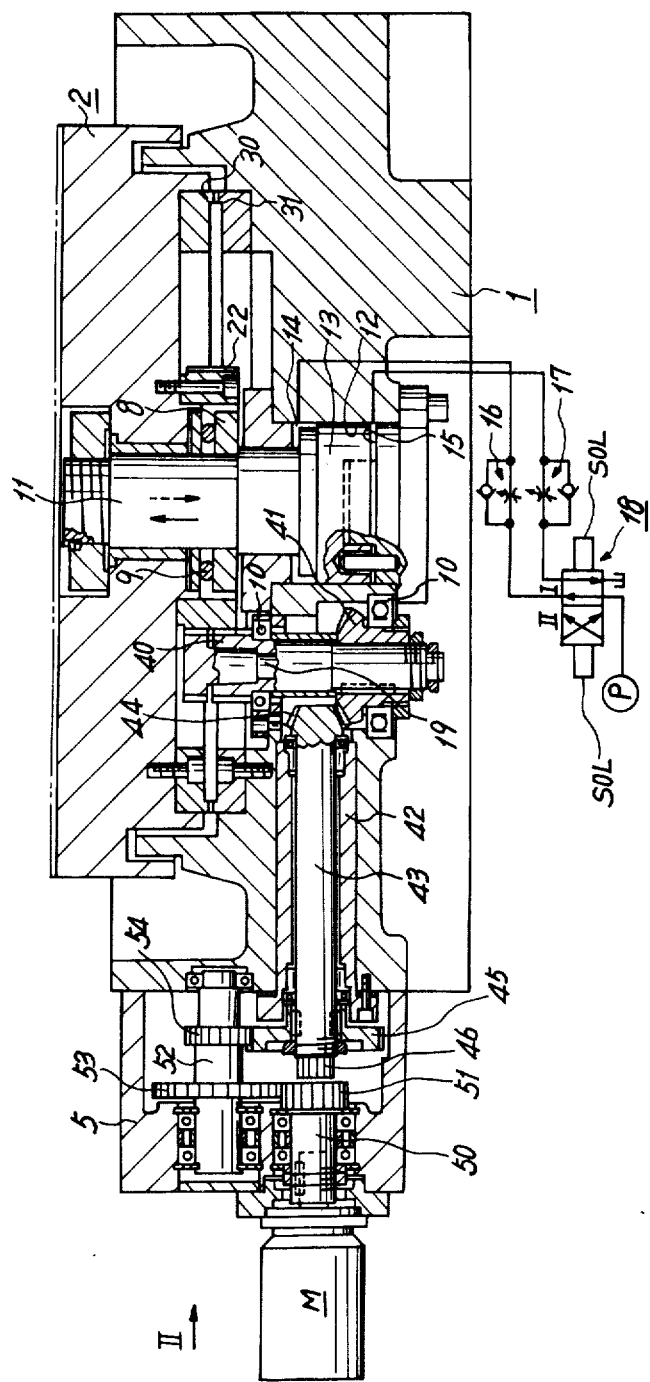
FIG. 1 is a vertical sectional view of an index apparatus according to the present invention.

Referring now to the drawings, wherein like reference numerals or characters refer to identical or corresponding parts throughout the several views, and more particularly to FIG. 1, there is shown a base 1 which is formed with a vertical cylindrical bore 12. A piston 13 is slidably received in the cylindrical bore 12 and provided with a piston rod 11 integrally connected thereto. The piston rod 11 is provided with a shoulder portion, not numbered, with which a collar member 8 is held in engagement. A rotary table 2 is rotatably mounted on the collar member 8 through roller members 9. Upper and lower cylindrical chambers 14 and 15 defined by the piston 13 are connected through flow control valves 16 and 17 and a solenoid valve 18 to a pressurized fluid supply source P, so that the rotary table 2 is lifted and lowered by the control of the solenoid valve 18. An annular toothed coupling member 30, having a plurality of teeth spaced one degree apart with respect to each other, is secured to the underside of the rotary table 2. Another annular toothed coupling member 31 complementary to the annular toothed coupling member 30 is secured to the top surface of the base 1. These toothed coupling members 30 and 31 are engaged when the rotary table 2 is lowered and disengaged when the rotary table 2 is lifted.

A gear 22 is secured to the underside of the rotary table 2 within the annular toothed coupling member 30 and is meshingly engaged with a gear 40 secured to a rotary shaft 19, which is rotatably supported by the base 1 through bearings 10. The rotary shaft 19 has also keyed thereto a bevel gear 41 which is meshingly engaged with a bevel gear 44 formed on one end of a transmission shaft 43. The transmission shaft 43 is rotatably supported within the base 1 through a sleeve 42.

Figure 3:
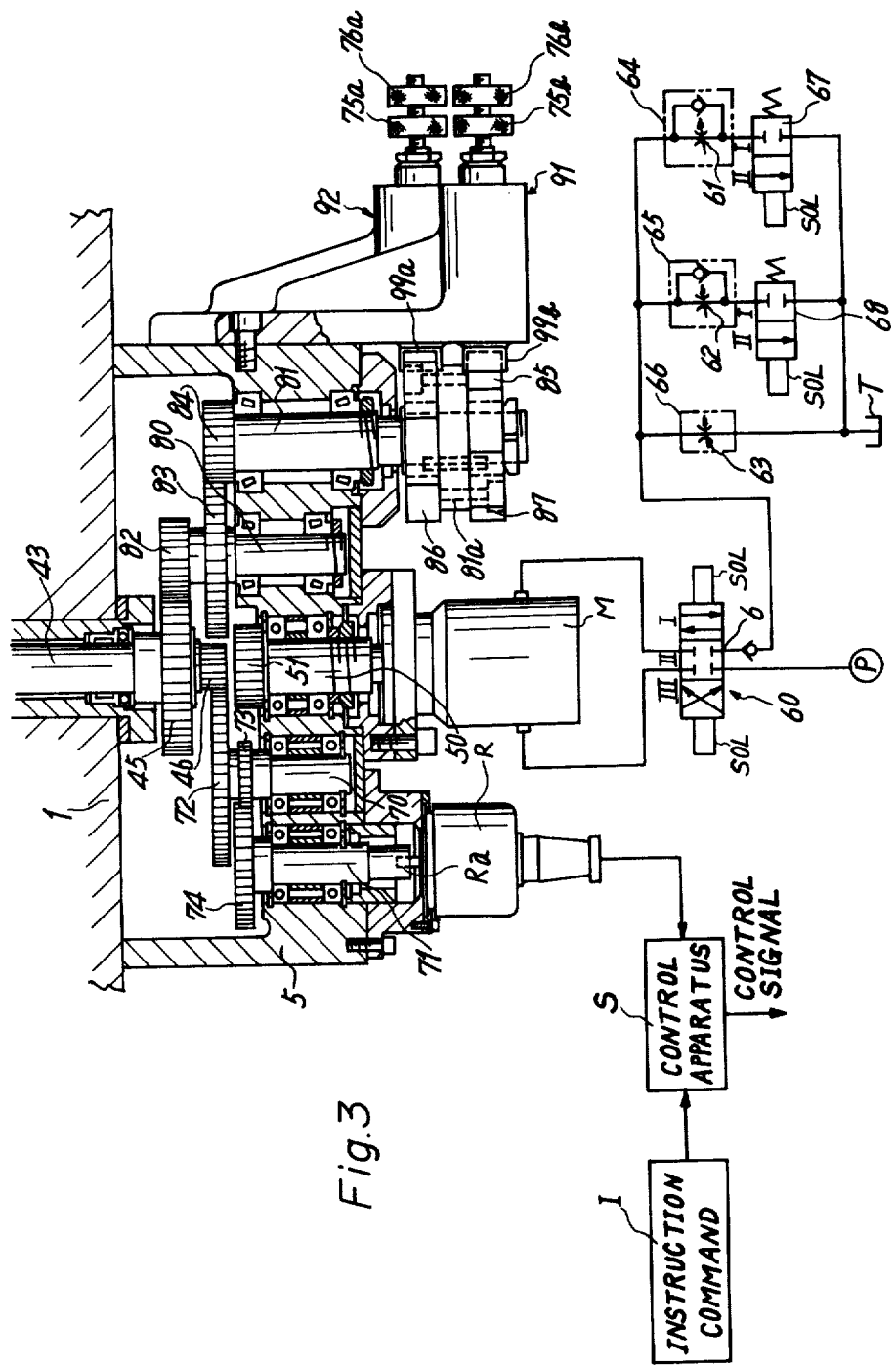
FIG. 3 is a sectional view taken along the lines III—III in FIG. 2.

A gear box 5 is secured to the side face of the base 1 and supports a hydraulic motor M for rotating the rotary table 2. The output shaft of the hydraulic motor M is drivingly connected to a drive shaft 50 which has a gear 51 keyed thereto. The transmission shaft 43 is formed at the other end thereof with a pair of gears 45 and 46. The gears 51 and 45 are meshingly engaged with gears 53 and 54, respectively, which are formed on an intermediate shaft 52 rotatably supported within the gear box 5. As shown in FIG. 3, the hydraulic motor M is communicated with the pressure fluid supply source P through a solenoid valve 60 so as to be rotated in either one or the other direction, or stopped, by the control of the solenoid valve 60.

The exhaust port 6 of the solenoid valve 60 is communicated to a reservoir T through first to third flow control valves 64, 65, and 66 arranged in parallel relationship with each other. The flow control vlaves 64, 65, and 66 comprise throttles 61, 62, and 63, respectively. The flow control valves 64 and 65 are controlled by solenoid valves 67 and 68 arranged in series thereto, respectively. The degree of throttling of the throttle valve 61 is smaller than that of the throttle valve 62 which is also smaller than that of the throttle valve 63. Rotational speed of the hydraulic motor M or the rotary table 2 is controlled by the solenoid valves 67 and 68, as described later.

The gear 46 formed on the transmission shaft 43 is meshingly engaged with a gear 72 formed on a first support shaft 70 which is rotatably supported by the gear box 5. The first support shaft 70 is also provided with a gear 73 which is meshed with a gear 74. The gear 74 is formed on a second support shaft 71 drivingly connected to an operating shaft Ra of a rotary encoder R which serves as an angular position detecting device for digitally detecting the angular position of the rotary table 2. The operating shaft Ra of the rotary encoder R is rotated the same angular amount as that of the rotary table 2 through gearings so that the rotary encoder R generates a signal each time the rotary table 2 is rotated a unit angle or one degree. A signal from the rotary encoder R is applied to a control apparatus S which comprises a counter. The control apparatus S is also connected to an instruction apparatus I to receive an instruction for a desired angular position of the rotary table 2. The content of the counter is reduced one by one each time a signal from the rotary encoder R is applied thereto. The control apparatus S generates a control signal for the control of the hydraulic motor M based upon the content of the counter, described later.

The gear 45 formed on the transmission shaft 43 is also meshingly engaged with the gear 82 formed on a rotary shaft 80 which is rotatably supported by the gear box 5. The rotary shaft 80 is also formed with a gear 83 which is meshed with a gear 84. The gear 84 is formed on a rotary shaft 81 rotatably supported by the gear box 5. The rotary shaft 81 has keyed thereto a spacing collar member 81a on which a pair of index plates 85 and 86 are adjustably mounted with a predetermined distance therebetween. Each of the index plates 85 and 86 has eight equidistantly spaced tooth-like engaging portions 87 on its periphery. It is to be noted that the number of the engaging portions 87 of each of the index plates is determined based upon the rotational ratio of the rotary shaft 81 relative to the rotary table 2 in such a manner that each engaging portion 87 is rotated one pitch when the rotary table 2 is rotated one degree. The index plates 85 and 86 are so arranged that each engaging portion 87 of the one index plate 85 is equidistantly positioned between the two engaging portions 87 of the other index plate 86. In order to make an angular adjustment of each index plate relative to the collar member 81a, each of the index plates 85 and 86 is provided with arcuate extending slots 88 through which clamping bolts 89 are screwed into the collar member 81a. After angular adjustment of each index plate relative to the collar member 81a, positioning pins 89a are inserted through the index plates 85 and 86 and the collar member 81a. Accordingly, the index plates 85 and 86 are rotated with the rotary shaft 81. The index plates 85 and 86 are so designed as to be rotated one revolution through the gearings when the rotary table 2 is rotated 8 degrees, that is, the index plates are rotated 45 degrees when the rotary table 2 is rotated one degree.

A pair of hydraulic actuators 91 and 92 are formed in a bracket, not numbered, which is secured to the gear box 5. The hydraulic actuators 91 and 92 comprise pistons 94a and 94b slidably received in cylindrical bores 93a and 93b, respectively. Hydraulic chambers 95a and 96a defined by the piston 94a and the cylindrical bore 93a, and hydraulic chambers 95b and 96b defined by the piston 94b and the cylindrical bore 93b, are communicated with the pressure fluid supply source P through respective solenoid valves 97 and 98. The piston 94a has integrally formed therewith at its one end an abutting member 99a which is abuttable with the engaging portion 87 of the index plate 85 in order to restrict the rotation of the index plate 85 in a normal, or one, direction and to index the same to a predetermined angular position. The piston 94b has also integrally formed therewith at its one end an abutting member 99b which is abuttable with the engaging portion 87 of the index plate 86 in order to restrict the rotation of the index plate 86 in a reverse, or the other, direction and to index the same to a predetermined angular position. The piston 94a has at its other end a pair of dogs 75a and 76a for actuation of limit switches LS2 and LS1 to confirm the advanced and retracted ends of the piston 94a. The piston 94b has also at its other end a pair of dogs 75b and 75b for actuation of limit switches LS4 and LS3 to confirm the advanced and retracted ends of the piston 94b.

The operation of the above constructed index apparatus for the rotary table according to the present invention will now be described.

When an index command is applied, the solenoid valve 18 is changed over to its position II to supply pressurized fluid into the lower cylindrical chamber 15 to lift the piston rod 11 and the rotary table 2. Accordingly, the annular toothed coupling member 30 is disengaged from the other toothed coupling member 31 to thereby permit rotation of the rotary table 2 relative to the base 1. When a normal direction index command is thereafter applied to the control apparatus S from the instruction apparatus I, the control apparatus S presets a value corresponding to the command in the counter and generates a control signal to change over the solenoid valve 60 to its position I and the solenoid valves 67 and 68 to their positions II so that the hydraulic motor M is actuated to rapidly rotate the rotary table 2 in the normal direction through gears 41, 53, 54 and 45, bevel gears 44 and 41, and gears 40 and 22. (It is to be understood that when a reverse direction index angle command is applied to the control apparatus S, the solenoid valve 60 is changed over to its position III). At this time, the operating shaft Ra of the rotary encoder R is rotated synchronously with the rotation of the rotary table 2 and the rotary encoder R generates a signal each time the rotary table 2 is rotated one degree. This signal is applied to the control apparatus S to reduce the content of the counter one by one. When the content of the counter becomes to a predetermined value which indicates that the rotary table 2 is rotated to a position which is spaced a predetermined angle from the commanded angular index position thereof, the control apparatus S generates a control signal, so that the solenoid valve 67 is changed over to its position I to rotate the rotary table 2 at a slower speed than the rapid speed.

Figure 2:
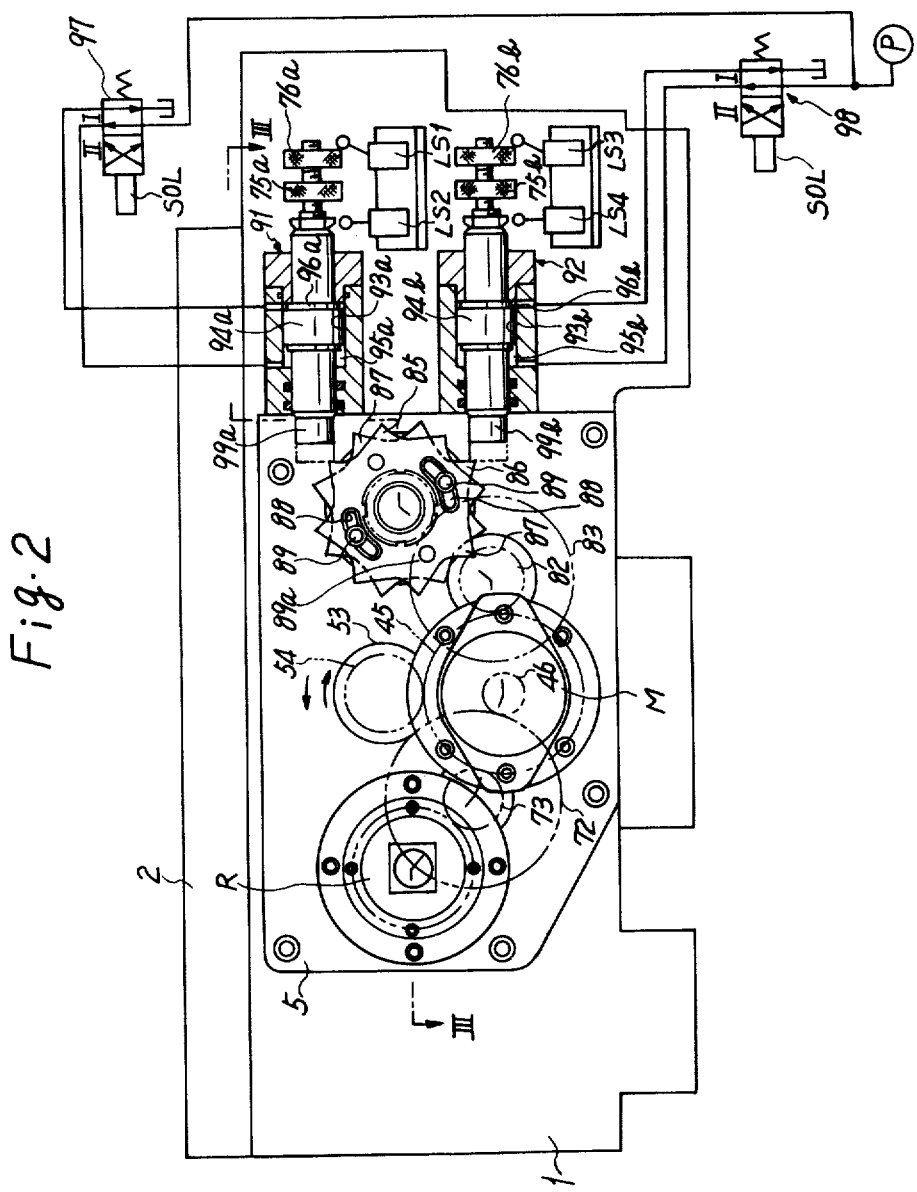
FIG. 2 is a side view, partly in section, as viewed in the direction of the arrow II in FIG. 1.

When the content of the counter becomes to a predetermined value which indicates that the rotary table 2 is rotated to a position which is spaced about one degree from the commanded angular index position thereof, the control apparatus S generates a control signal to change over the solenoid valves 68 and 97 to their positions I and II, respectively. (It is to be noted that when the rotary table 2 is commanded to be rotated in the reverse direction, the solenoid valve 98 instead of the solenoid valve 97 is changed over to its position II.) Accordingly, the rotary table 2 is rotated at a further slower speed. At the same time therewith, the piston 94a is advanced to position the abutting member 99a at its advanced position indicated by phantom lines in FIG. 2. With the abutting member 99a being positioned at its advanced position, the dog 75a actuates the limit switch LS2 to energize a timer, not shown. When the engaging member 87 of the index plate 85 is thereafter moved into abutting engagement with the abutting member 99a, the rotary table 2 reaches its commanded angular index position and is precisely located in position. When the timer is timed out after a predetermined time period, the solenoid valve 60 is changed over to its position II to stop the operation of the hydraulic motor M. At the same time therewith, the solenoid valve 97 is changed over to its position I to move the abutting member 99a away from the engaging portion 86 of the index plate 85 into its retracted position indicated by the solid lines in FIG. 2. When the abutting member 99a is moved into its retracted position, the dog 76a actuates the limit switch LS1 to change over the solenoid valve 18 to its position I. Accordingly, pressure fluid is supplied to the upper cylinder chamber 14 to lower the piston rod 11 and the rotary table 2 so that the annular toothed coupling member 30 is smoothly and precisely engaged with the annular toothed coupling member 31. In this manner, the rotary table 2 is effectively and accurately indexed to a desired angular position.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by letters patent of the United States is:

1. An index apparatus for indexing a rotary table comprising:
    a base;
    a rotary table rotatably and vertically slidably received within said base;
    a first annular toothed coupling member secured to said rotary table;
    a second annular toothed coupling member engageable with said first annular coupling member and secured to said base;
    a hydraulic actuator formed in said base and connected to said rotary table for lifting said rotary table to disengage said first coupling member from said second coupling member to permit rotation of said rotary table relative to said base and for lowering said rotary table to engage said first coupling member with said second member;
    means connected to said drive means for generating a signal, each time said rotary table is rotated a unit angle corresponding to one pitch of the teeth of said first and second coupling members;
    first control means connected to said drive motor for controlling the operation thereof;
    means for instructing a desired angular position of said rotary table;
    second control means responsive to said instructing means and a signal from said generating means for causing said first control means to reduce the rotational speed of said rotary table, when said rotary table is rotated to a position spaced a predetermined angular distance from the desired angular position thereof; and
    means operated responsive to said second control means for restricting the rotation of said rotary table when said rotary table is rotated to the desired angular position;
    said hydraulic actuator being operable to lower said rotary table to engage said first coupling member with said second coupling member, after said restricting means is operated.

2. An index apparatus for indexing a rotary table comprising:
    a base;
    a rotary table rotatably and vertically slidably received within said base;
    a first annular toothed coupling member secured to said rotary table;
    a second annular toothed coupling member engageable with said first annular coupling member and secured to said base;
    a hydraulic actuator formed in said base and connected to said rotary table for lifting said rotary table to disengage said first coupling member from said second coupling member to permit rotation of said rotary table relative to said base and for lowering said rotary table to engage said first coupling member with said second coupling member;
    a hydraulic motor for rotating said rotary table;
    gearing means connected between said hydraulic motor and said rotary table for transmitting the power of said hydraulic motor to said rotary table;
    means connected to said gearing means for generating a signal, each time said rotary table is rotated a unit angle corresponding to one pitch of the teeth of said first and second coupling members;
    hydraulic control means connected to said hydraulic motor for controlling the operation thereof;
    means for instructing a desired angular position of said rotary table;
    counter means connected to said instructing means for receiving a value of the desired angular position of said rotary table and connected to said signal generating means to receive a signal from said generating means so as to subtract the content thereof, said counter means being operable to cause said hydraulic control means to reduce the rotational speed of said rotary table, when the content of said counter means indicates that said rotary table is rotated to a position spaced a predetermined angular distance from the desired angular position thereof; and
    means operated in response to the content of said counter means for restricting the rotation of said rotary table to position said rotary table to the desired angular position thereof;
    said hydraulic actuator being operable to lower said rotary table to engage said first coupling member with said second coupling member, after said restricting means is operated.

3. An index apparatus as claimed in claim 2, wherein said restricting means is operated when said counter means indicates that said rotary table is rotated to a position spaced a unit angle from the desired angular position thereof.

4. An index apparatus as claimed in claim 3, wherein said generating means generates a signal, each time said rotary table is rotated one degree.

5. An index apparatus as claimed in claim 2, wherein said restricting means comprises:
   a rotary shaft drivingly connected to said gearing means in such a manner as to be rotated n revolutions when said rotary table is rotated one revolution, where n is a positive integer;
   an index plate secured to said rotary shaft and having n engaging portions, and
   a slidable piston having an engaging member engageable with said engaging portion of said index plate to restrict a rotation of said rotary table.

6. An index apparatus as claimed in claim 2, wherein said restricting means comprises:
   a rotary shaft drivingly connected to said gearing means in such a manner as to be rotated n revolutions when said rotary table is rotated one revolution, where n is a positive integer and larger than one;
   a pair of index plates angularly adjustably secured to said rotary shaft and each having n engaging portions, one engaging portion of one said index plates being angularly positioned between two adjacent engaging portions of said index plates; and
   a pair of slidable pistons having a pair of engaging members, one of said engaging members being engageable with each engaging portion of one of said index plates to restrict a rotation of said rotary table in one direction, and the other of said engaging members being engageable with each engaging portion of the other of said index plates to restrict a rotation of said rotary table in the other direction.

* * * * *